(12) United States Patent
Silva et al.

(10) Patent No.: US 12,526,312 B1
(45) Date of Patent: Jan. 13, 2026

(54) SYSTEMS AND METHODS FOR PREVENTING SOCIAL ENGINEERING SCAM ATTACKS BY UTILIZING TRUSTED COMMUNICATION CHANNELS FOR DIGITAL SERVICES

(71) Applicant: GEN DIGITAL INC., Tempe, AZ (US)

(72) Inventors: David Luz Silva, Dublin (IE); Johann Roturier, Maynooth (IE)

(73) Assignee: Gen Digital Inc., Tempe, AZ (US)

( * ) Notice: Subject to any disclaimer, the term of this patent is extended or adjusted under 35 U.S.C. 154(b) by 241 days.

(21) Appl. No.: 18/515,741

(22) Filed: Nov. 21, 2023

(51) Int. Cl.
*H04L 9/40* (2022.01)

(52) U.S. Cl.
CPC .......... *H04L 63/1483* (2013.01); *H04L 63/08* (2013.01); *H04L 2463/082* (2013.01)

(58) Field of Classification Search
CPC ............................ H04L 63/1483; H04L 63/08
See application file for complete search history.

(56) References Cited

U.S. PATENT DOCUMENTS

2010/0138925 A1* 6/2010 Barai .................. H04L 63/1433 726/25
2025/0131417 A1* 4/2025 Wolfe ................ G06Q 20/4014

OTHER PUBLICATIONS

Finley, Klint, "This Company Wants to Use the Blockchain to Stop Phishing", wired.com, Business, Dec. 6, 2018, retrieved Mar. 7, 2024; 14 pages.
Walsh, Paul, "MetaCert Protocol Technical Paper", METACERT; 25 pages.

* cited by examiner

Primary Examiner — Benjamin A Kaplan
(74) Attorney, Agent, or Firm — Greenberg Traurig, LLP

(57) ABSTRACT

A computer-implemented method for preventing social engineering scam attacks by utilizing trusted communication channels for digital services may include (i) detecting a communication attempt associated with accessing a digital service over a communication channel, (ii) determining whether the communication channel is an untrusted channel, and (iii) performing a security action that protects against a potential social engineering scam attack upon determining that the communication channel is the untrusted channel. Various other methods, systems, and computer-readable media are also disclosed.

20 Claims, 7 Drawing Sheets

SYSTEMS AND METHODS FOR PREVENTING SOCIAL ENGINEERING SCAM ATTACKS BY UTILIZING TRUSTED COMMUNICATION CHANNELS FOR DIGITAL SERVICES

BACKGROUND

Computing device users often utilize multiple communication channels for interacting with digital service providers (e.g., financial services, e-commerce, etc.). For example, multiple e-mail addresses, website links, SMS notifications, and/or telephone numbers may be provided by an online bank for customer interactions and for performing various account tasks (e.g., bill pay, checking account balances, customer service queries, etc.). In some instances, many (if not all) of these communication channels may be unknown to most users, thereby providing opportunities for malicious actors to take advantage by contacting unsuspecting users over fake communication channels and luring them into digital scams and/or social engineering attacks.

Traditional approaches utilized by threat protection software for protecting against digital scams may often involve utilizing a combination of website certificate data, screenshot analysis (e.g., by utilizing computer vision and machine-learning techniques) network data gathering, and reputation systems for identifying potential attacks. These traditional approaches often rely on multiple user data sources (e.g., knowledge gathered from user services, user environments, and user attack histories) as inputs. However, the user data sources may often contain contradictory data, resulting in unreliable and/or unsatisfactory results. Moreover, the aforementioned traditional approaches often involve continuous production and updates, high infrastructure, and other resource costs to address various systems maintenance and accuracy requirements.

SUMMARY

As will be described in greater detail below, the present disclosure describes various systems and methods for preventing social engineering scam attacks by utilizing trusted communication channels for digital services.

In one example, a method for preventing social engineering scam attacks by utilizing trusted communication channels for digital services may include (i) detecting, by one or more computing devices, a communication attempt (e.g., an SMS message, a voice/telephone communication, an e-mail message, etc.) associated with accessing a digital service over a communication channel, (ii) determining, by the one or more computing devices, whether the communication channel is an untrusted channel, and (iii) performing, by the one or more computing devices, a security action that protects against a potential social engineering scam attack upon determining that the communication channel is the untrusted channel.

In some examples, the communication channel may be determined to be an untrusted channel by (i) establishing a proxy communication channel that receives communication requests for accessing the digital service, (ii) detecting whether the communication attempt is received over the proxy communication channel or another communication channel, and (iii) determining that the communication channel is the untrusted channel when the communication attempt is received over the another communication channel. In some examples, the proxy communication may be established by generating a communication address (e.g., an e-mail address or telephone number) for receiving the communication requests for accessing the digital service and then authenticating data including the communication attempt for sending utilizing the communication address. In one example, the communication attempt data may be encrypted and authenticated utilizing multi-factor authentication.

In some examples, the communication channel may alternatively be determined to be an untrusted channel by (i) detecting a communication attempt over the communication channel by an entity associated with providing the digital service, (ii) retrieving a profile including a list of digital services associated with a receiving party of the communication attempt, (iii) querying, based on the profile, a data store to identify a list of source communication channels associated with the list of digital services, and (iv) determining, based on the list of source communication channels, that the communication channel is the untrusted channel. In some examples, the data store may be a distributed file system for the list of source communication channels. In other examples, the data store may be a blockchain for the list of source communication channels. In some examples, the communication channel may be determined to be the untrusted channel when the list of source communication channels excludes the communication channel receiving the communication attempt.

In some examples, the security action may include generating a notification to a requester of the communication attempt that the communication channel is the untrusted channel.

In one embodiment, a system for preventing social engineering scam attacks by utilizing trusted communication channels for digital services may include at least one physical processor and physical memory including computer-executable instructions and a set of modules that, when executed by the physical processor, cause the physical processor to (i) detect, by a detection module, a communication attempt associated with accessing a digital service over a communication channel, (ii) determine, by a determining module, whether the communication channel is an untrusted channel, and (iii) perform, by a security module, a security action that protects against a potential social engineering scam attack upon determining that the communication channel is the untrusted channel.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a communication attempt associated with accessing a digital service over a communication channel, (ii) determine whether the communication channel is an untrusted channel, and (iii) perform a security action that protects against a potential social engineering scam attack upon determining that the communication channel is the untrusted channel.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

Figure 1:
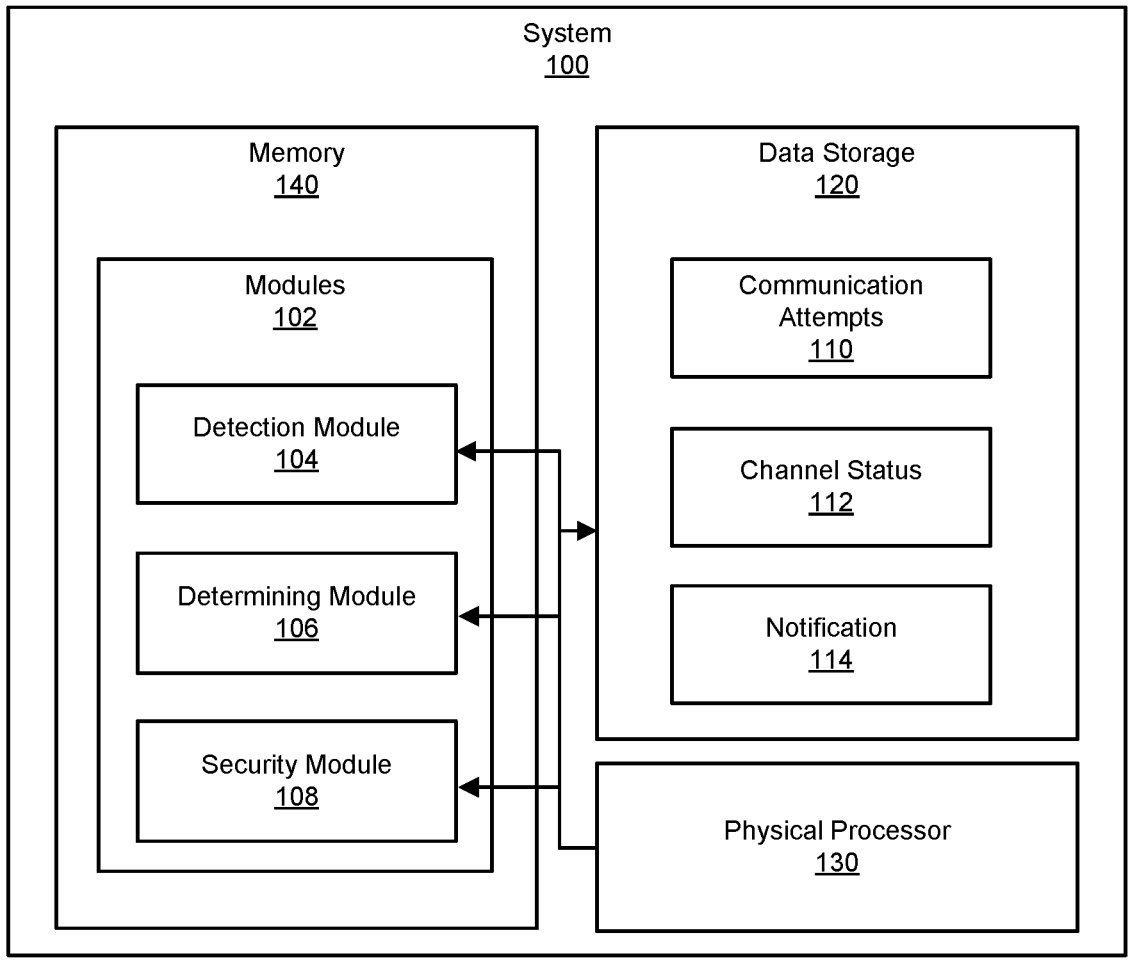
FIG. 1 is a block diagram of an example system for preventing social engineering scam attacks by utilizing trusted communication channels for digital services.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for preventing social engineering scam attacks by utilizing trusted communication channels for digital services. As will be described in greater detail below, the systems and methods described herein may establish trusted communication channels between users and digital services that enable users to be promptly informed by service providers on the trustworthiness of communication attempts. The trusted communication channels may be established as user-driven/user-centric channels by utilizing a number of approaches including using a threat protection service as either a communication channel proxy or as an observer of direct service-to-user communications. For example, under one approach, a threat protection service may host dedicated/trusted communication channels for services to use as a proxy for generating communication attempts with users. Under another approach, a threat protection service may provide a list of communication channels (which may be encrypted to ensure data integrity and manageable data access controls) that is stored within a distributed file system or a hosted blockchain. The list may then be utilized to validate communication channel attempts between a user and a digital service provider. Any communication attempts utilizing channels that do not originate from the proxy or the provided channel list may then generate a notification informing users of the identification of a potentially untrusted communication channel from the threat protection service. By identifying potentially untrusted communication channels, the systems and methods described herein may improve the technical fields of computer device security and/or data privacy by protecting against scams and social engineering attacks initiated by threat actors to facilitate the unintentional disclosure of sensitive/private user data for malicious purposes.

Figure 2:
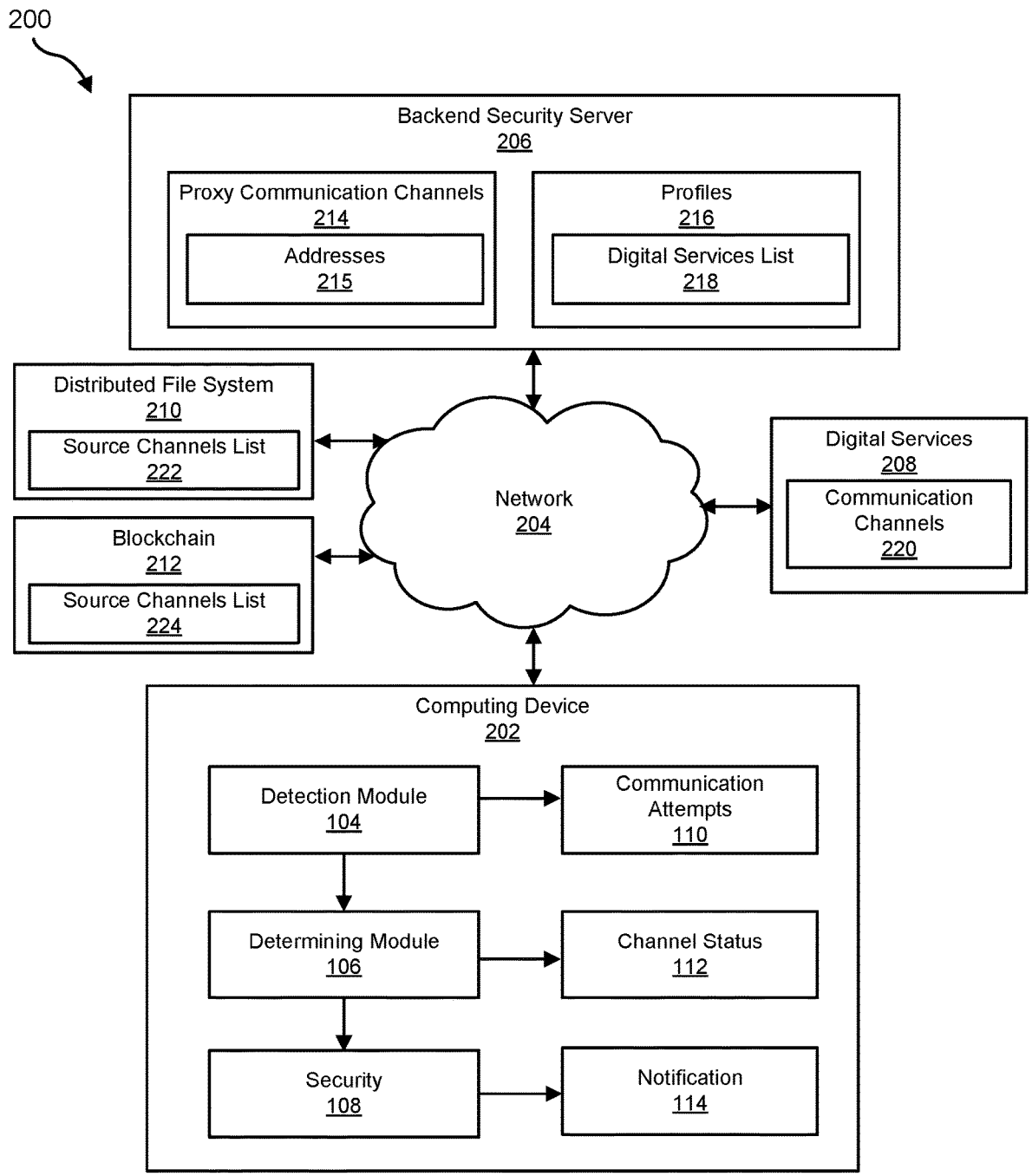
FIG. 2 is a block diagram of an additional example system for preventing social engineering scam attacks by utilizing trusted communication channels for digital services.

The following will provide, with reference to FIGS. 1-2, detailed descriptions of example systems for preventing social engineering scam attacks by utilizing trusted communication channels for digital services. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing social engineering scam attacks by utilizing trusted communication channels for digital services. As illustrated in this figure, example system 100 may include one or more modules 102 for performing one or more tasks. As will be explained in greater detail below, modules 102 may include a detection module 104 that detects one or more communication attempts 110 associated with accessing a digital service over a communication channel. Example system 100 may additionally include a determining module 106 that determines whether the communication channel is an untrusted channel (i.e., a channel status 112). Example system 100 may also include a security module 108 that performs a security action (i.e., generating a notification 114) that protects against a potential social engineering scam attack upon determining that the communication channel is the untrusted channel. Although illustrated as separate elements, one or more of modules 102 in FIG. 1 may represent portions of a single module or application.

The term "digital service" as used herein, generally refers to any commercial/economic services provided to users over a computing network. For example, digital services may include, without limitation, financial services (e.g., consumer/enterprise banking, investing, etc.) provided by financial institutions, and e-commerce services (e.g., online shopping). In some examples, users may be required to provide private/sensitive data (e.g., user login names and passwords) for accessing digital services.

The term "communication channel" as used herein, generally refers to any technology or method that may be utilized for communicating data associated with interacting with digital services. For example, communication channels may include, without limitation, e-mail, SMS, or voice/telephony technology for communicating messages (e.g., messages originating from and directed to e-mail addresses and telephone numbers) relating to utilizing a digital banking service provided by a financial institution. In some examples, a digital service may be associated with multiple communication channels (e.g., multiple e-mail addresses) as well as multiple communication channel types (e.g., e-mail, SMS, and voice/telephony).

The term "communication attempt" as used herein, generally refers to any initiation of a communication method for communicating with a digital service over a communication channel. For example, a communication attempt may include an invoice sent via e-mail sent from an e-commerce services provider to a customer requesting a reply via a website link or telephone number, both of which may be unfamiliar to the customer.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, backend security server 206, digital services 208, distributed file system 210 and/or blockchain 212). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing social engineering scam attacks by utilizing trusted communication channels for digital services. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In some examples, data storage 120 may store communication attempts 110, channel status 112, and notification 114.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, backend security server 206, digital services 208, distributed file system 210 (including source channels list 222), blockchain 212 (including source channels list 224), and/or any other suitable computing system. As will be described in greater detail below, one or more of modules 102 from FIG. 1 may, when executed by at least one processor of computing device 202 and/or backend security server 206, enable computing device 202 and/or backend security server 206 to prevent social engineering scam attacks by utilizing trusted communication channels for digital services. For example, and as will be described in greater detail below, detection module 104, determining module 106, and security module 108 may cause computing device 202 and/or backend security server 206 to (i) detect a communication attempt 110 associated with accessing a digital service 208 over a communication channel 220, (ii) determine whether communication channel 220 is an untrusted channel (i.e., by determining channel status 112), and (iii) perform a security action (e.g., generating notification 114) that protects against a potential social engineering scam attack upon determining that communication channel 220 is the untrusted channel.

Computing device 202 generally represents any type or form of computing device capable of reading computer-executable instructions. In some examples, computing device 202 may be an endpoint device running client-side security software configured to identify potential security threats, such as social engineering scam attacks. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Backend security server 206 generally represents any type or form of computing device that is capable of executing and/or reading computer-executable instructions. In some examples, backend security server 206 may be a security server configured to perform various verification tasks such as utilizing distributed file system 210 or blockchain 212 to retrieve and query transactions for services in digital services list 218 stored in profiles 216 associated with accessing said services. Additionally or alternatively, backend server 206 may be a security server configured to perform various proxy tasks such as utilizing proxy communication channels 214 for providing addresses 215 (i.e., trusted addresses) associated with communication requests between a user and digital services 208. Additional examples of backend security server 206 include, without limitation, application servers, web servers, storage servers, and/or database servers configured to run certain software applications and/or provide various security, web, storage, and/or database services. Although illustrated as a single entity in FIG. 2, backend security server 206 may include and/or represent a plurality of servers that work and/or operate in conjunction with one another.

Network 204 generally represents any medium or architecture capable of facilitating communication or data transfer. In one example, network 204 may facilitate communication between computing device 202 and backend security server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
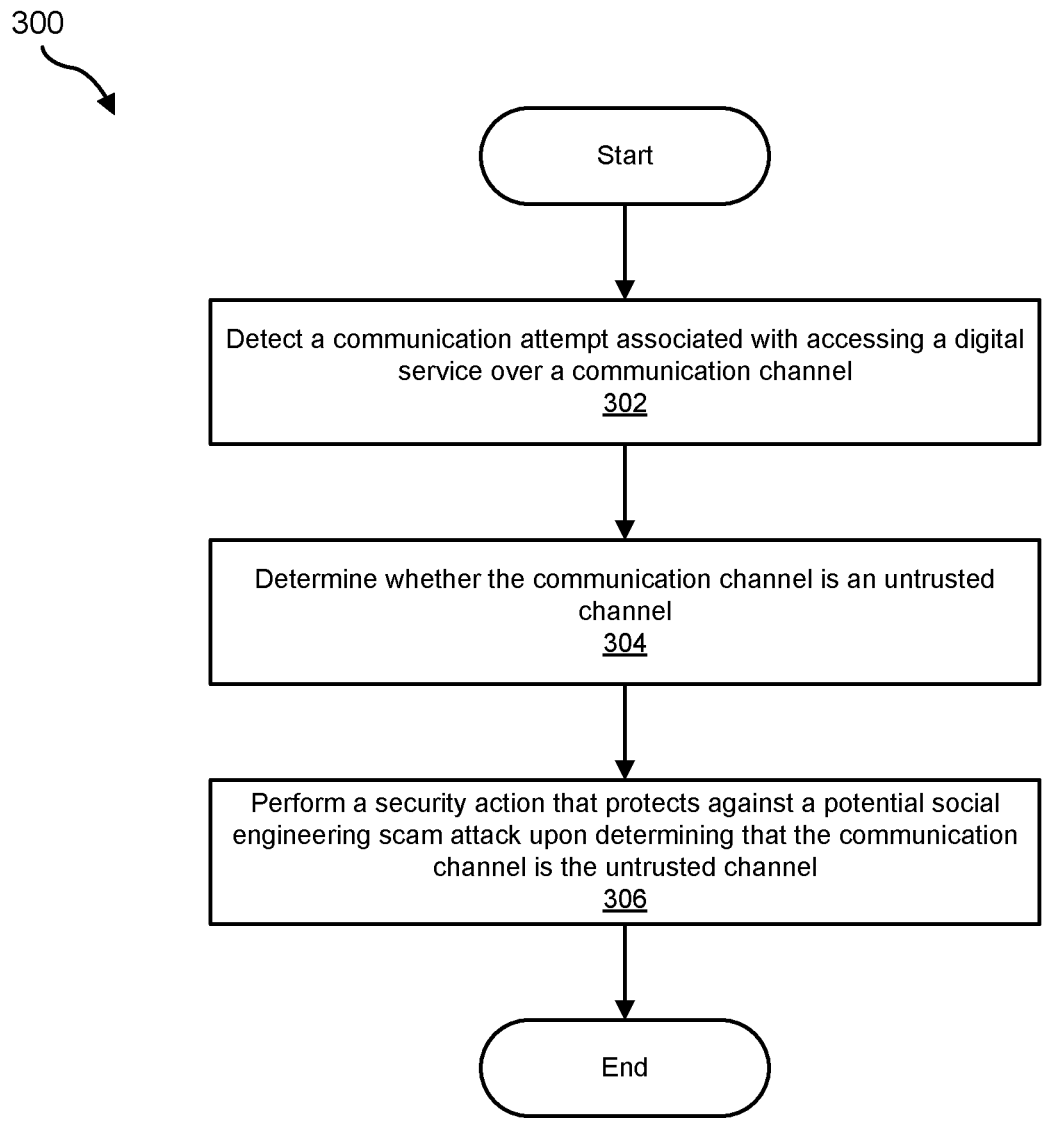
FIG. 3 is a flow diagram of an example method for preventing social engineering scam attacks by utilizing trusted communication channels for digital services.
Figure 4:
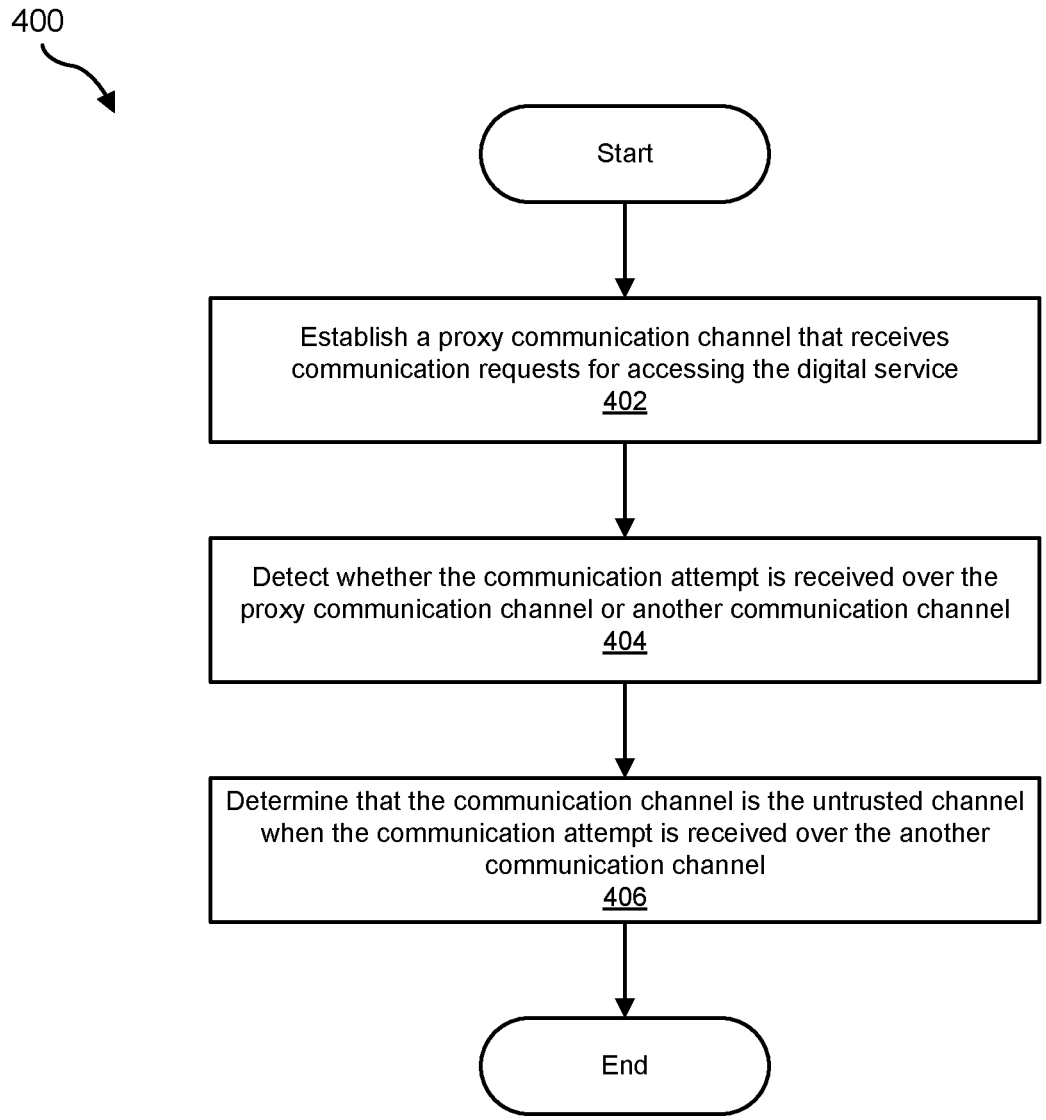
FIG. 4 is a flow diagram of an additional example method for preventing social engineering scam attacks by utilizing trusted communication channels for digital services.
Figure 5:
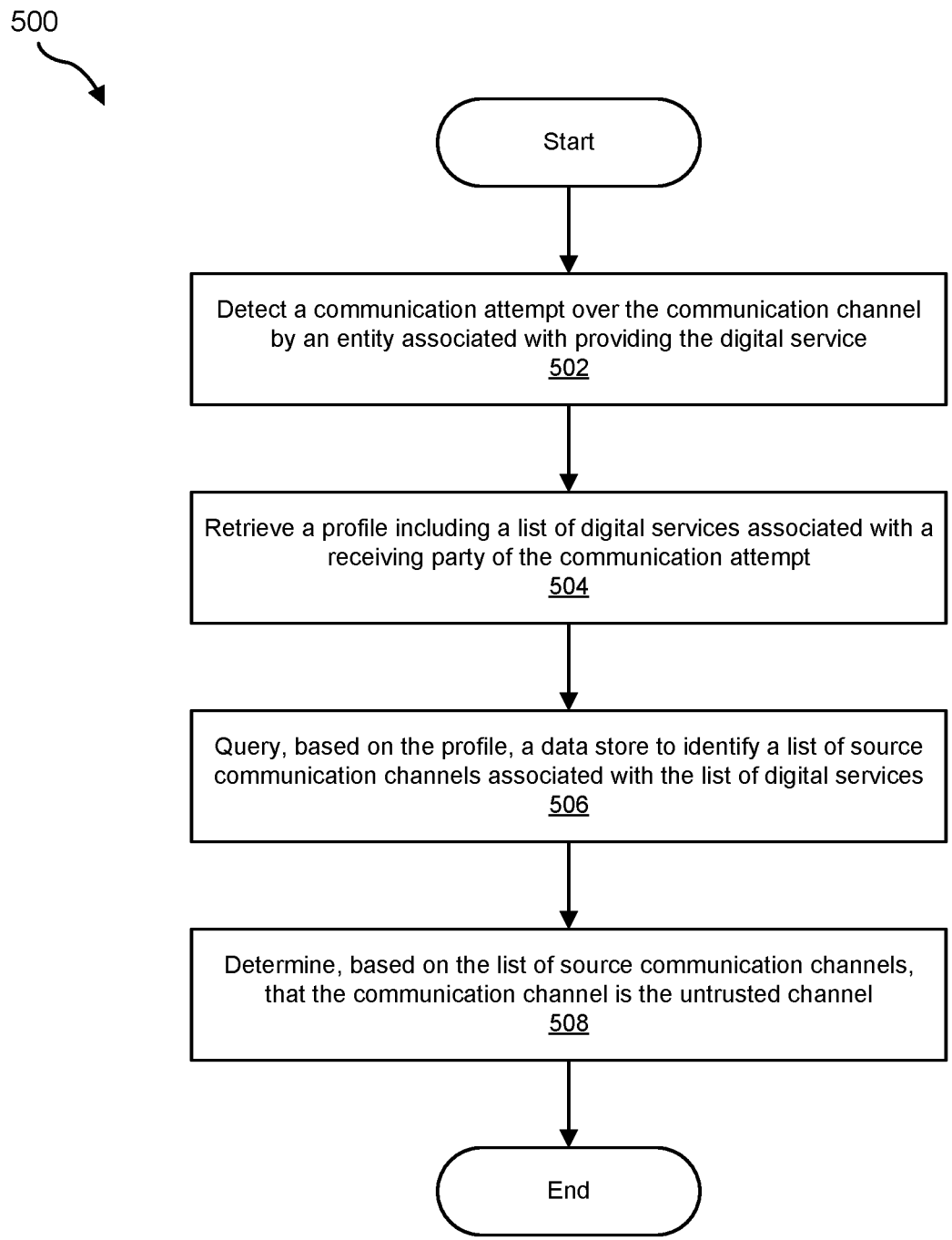
FIG. 5 is a flow diagram of an additional example method for preventing social engineering scam attacks by utilizing trusted communication channels for digital services.

FIGS. 3-5 are flow diagrams of example computer-implemented methods 300, 400, and 500 for preventing social engineering scam attacks by utilizing trusted communication channels for digital services. The steps shown in FIGS. 3-5 may be performed by any suitable computer-executable code and/or computing system, including system 100 in FIG. 1, system 200 in FIG. 2, and/or variations or combinations of one or more of the same. In one example, each of the steps shown in FIGS. 3-5 may represent an algorithm whose structure includes and/or is represented by multiple sub-steps, examples of which will be provided in greater detail below.

As illustrated in FIG. 3, at step 302 one or more of the systems described herein may detect a detect a communication attempt associated with accessing a digital service over a communication channel. For example, detection module 104 may, as part of computing device 202 in FIG. 2, detect a communication attempt 110 associated with accessing a digital service 208 over a communication channel 220.

Detection module 104 may detect communication attempt 110 in a variety of ways. In some examples, detection module 104 may receive messages (e.g., e-mails, SMS messages, etc.) shared by users (or intercepted from users with their permission) from a digital service provider including an address (e.g., a telephone number) for a communication channel 220.

At step 304, one or more of the systems described herein may determine whether the communication channel is an untrusted channel. For example, determining module 106 may, as part of computing device 202 in FIG. 2, determine whether a communication channel 220 (i.e., the communication channel associated with communication attempt 110 detected at step 302) is an untrusted channel (i.e., by determining channel status 112). In some examples, communication channels 220 may be hosted dedicated communication channels for digital services 208 to use as a proxy. For example, when a user is prompted with an email featuring content from a digital service provider or a telephone call from a digital service provider, the user would see the communication coming from a hosted endpoint (e.g., a third-party security service provider).

Determining module 106 may determine whether a communication channel 220 is an untrusted channel in a variety of ways as will now be described with respect to FIGS. 4-5. Turning now to FIG. 4, at step 402, determining module 106 may establish a proxy communication channel 214 that receives communication requests for accessing a digital service 208. In some examples, a proxy communication channel 214 may be established by generating a an address 215 for receiving the communication requests. Determining module 106 may then authenticate data including a communication attempt 110 for sending utilizing an address 215. In one example, the authentication may include encrypting the data including a communication attempt 110 and utilizing multi-factor authentication to authenticate the encrypted data.

At step 404, determining module 106 may detect whether a communication attempt 110 is received over a proxy communication channel 214 or another communication channel. For example, determining module 106 may determine whether or not a communication address in a communication attempt 110 corresponds to an address 215 in a proxy communication channel 214.

At step 406, determining module 106 may determine a communication channel 220 is an untrusted channel when a communication attempt 110 is received over another communication channel (e.g., a communication channel other than a proxy communication channel 214).

Turning now to FIG. 5, an alternative computer-implemented method of determining whether the communication channel is an untrusted channel will now be described. For example, at step 502, determining module 106 may detect a communication attempt 110 over a communication channel 220 by an entity associated with providing a digital service 208.

At step 504, determining module 106 may retrieve a profile 216 including digital services list 218 associated with a receiving party (i.e., a user of a digital service 208) of a communication attempt 110.

At step 506, determining module 106 may query, based on a profile 216, a data store to identify a list of source communication channels (e.g., source channels list 222 or source channels list 224) associated with the digital services list 218. In some examples, source channels lists 222 and 224 include a list of communication channels 220 provided by digital services 208 in a structured format, such as, for example: {Name: Telecommunications Company Communication Channels: Phone: [+351 896123989, +351 97871219] Email: [telecommuncations.marketing@vodafone.com] Web: [telecommuncations.com]}. In some examples, the communication channel entries in source channels lists 222 and 224 may be encrypted (e.g., by leveraging a public key infrastructure (PKI), to ensure data integrity and manageable data access controls, and then either stored within distributed file system 210 (such as an interplanetary file system (IPFS) or within blockchain 212 (which may be a public blockchain or, alternatively, an internal private blockchain hosted by a third-party security services provider).

Determining module 106 may query distributed file system 210 or blockchain 212 in a variety of ways. In some examples, determining module 106 may query distributed file system 210 for source channels list 222. Alternatively, determining module 106 may query blockchain 212 for source channels list 223. For example, determining module 106 may make use of blockchain 212 to pull the latest transaction for each service that is part of a profile 216 for a user. In some examples, this process may be completed during a user onboarding process and then recurrently so that backend security server 206 may be able to identify and retrieve files for performing the query operation.

At step 508, determining module 106 may determine, based on querying source channels lists 222 or 224, that a communication channel 220 is an untrusted channel. For example, determining module 106 may determine that a communication channel 220 is untrusted when a communication attempt 110 is received over a communication channel that is not included in the source channels lists 222 or 224.

Returning now to FIG. 3, at step 306, one or more of the systems described herein may perform a security action that protects against a potential social engineering scam attack upon determining that the communication channel is the untrusted channel. For example, security module 108 may, as part of computing device 202 in FIG. 2, generate notification 114 for a user that a communication channel 220 associated with a communication attempt 110 is an untrusted channel. In some examples, notification 114 may include a user informational alert such as "we cannot confirm the trustworthiness of this communication approach" or "Hey, you don't care who you are trying to call, but we care to inform you this is not a trusted communication channel for digital services." Alternatively, notification 114 may include a user informational alert that a communication channel 220 is trusted (e.g., "This communication channel seems to belong to your trusted services."). Additionally or alternatively, notification 114 may display a graphical representation of the trustworthiness of a communication channel 220, such as a "thumbs up" graphic for a trusted channel and a "thumbs down" graphic for an untrusted channel.

As explained above in connection with example methods 300 in FIG. 3, the systems and methods described herein may establish trusted communication channels between users and digital services that enable users to be promptly informed by service providers on the trustworthiness of communication attempts. The trusted communication channels may be established as user-driven/user-centric channels by utilizing a number of approaches including using a threat protection service as either a communication channel proxy or as an observer of direct service-to-user communications. For example, under one approach, a threat protection service may host dedicated/trusted communication channels for services to use as a proxy for generating communication attempts with users. Under another approach, a threat protection service may provide a list of communication channels (which may be encrypted to ensure data integrity and manageable data access controls) that is stored within a distributed file system or a hosted blockchain. The list may then be utilized to validate communication channel attempts between a user and a digital service provider. Any communication attempts utilizing channels that do not originate from the proxy or the provided channel list may then generate a notification informing users of the identification of a potentially untrusted communication channel from the threat protection service.

Figure 6:
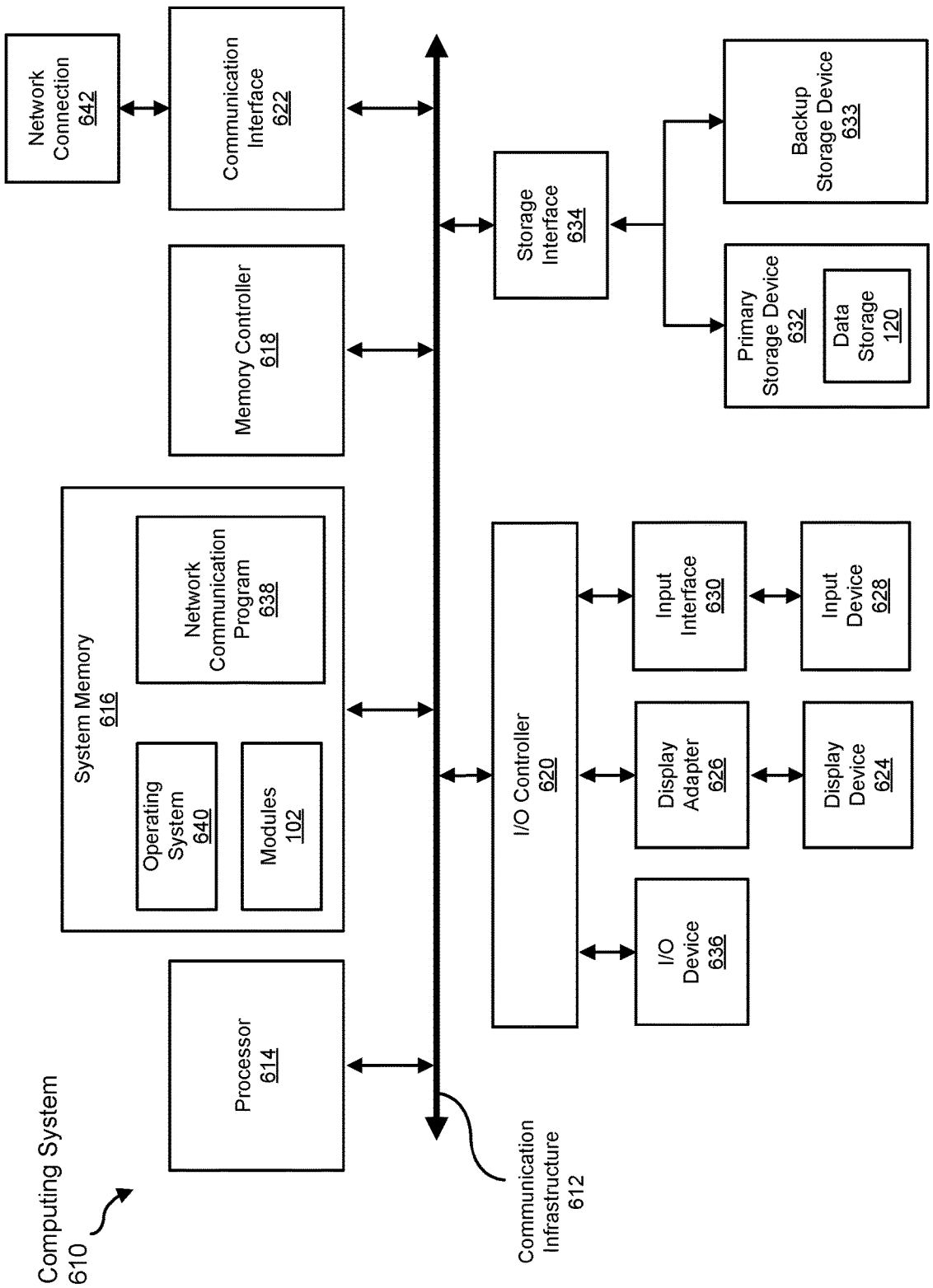
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
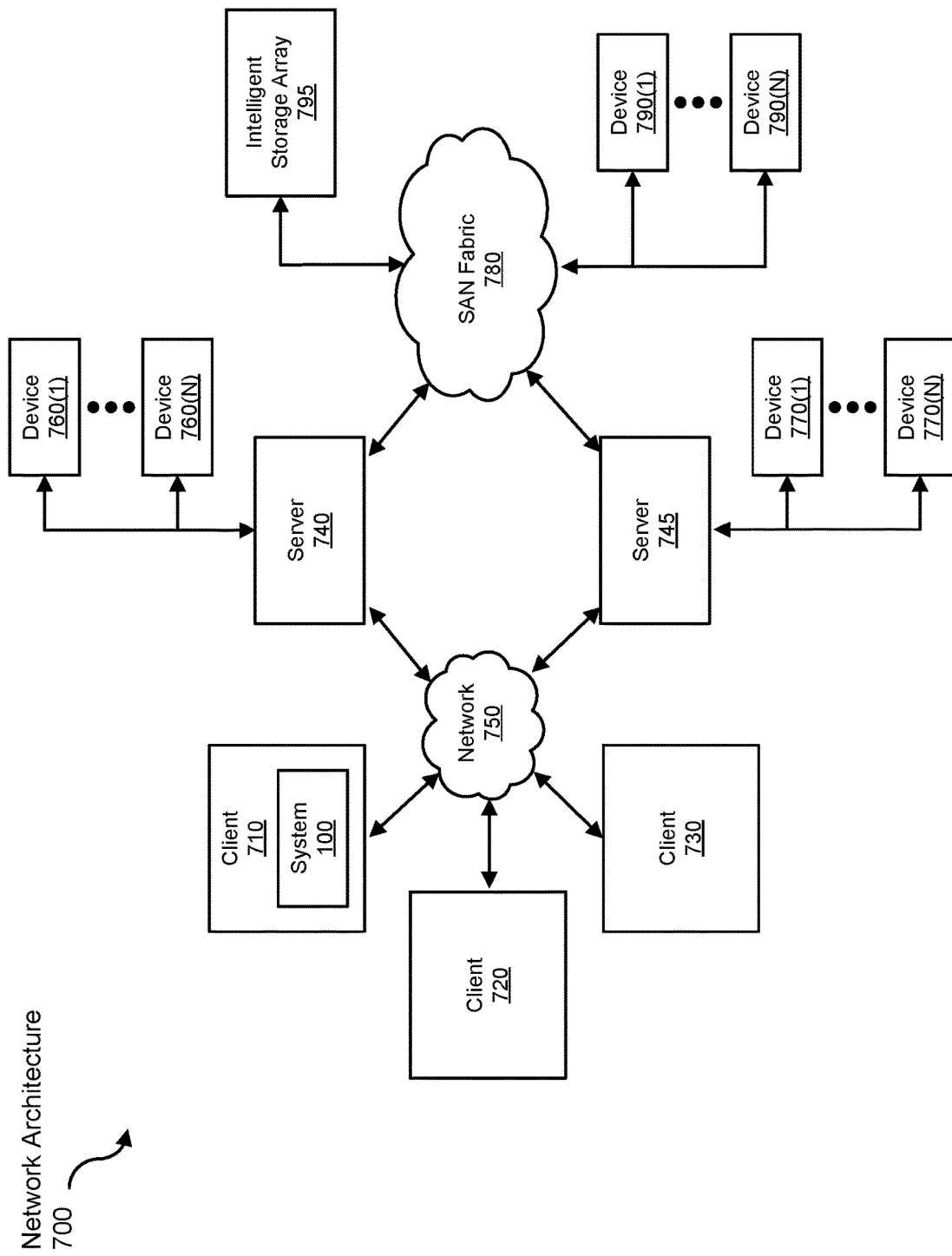
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing social engineering scam attacks by utilizing trusted communication channels for digital services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing social engineering scam attacks by utilizing trusted communication channels for digital services, at least a portion of the method being performed by one or more computing devices comprising at least one processor, the method comprising:
    detecting, by the one or more computing devices, a communication attempt associated with accessing a digital service over a communication channel;
    determining, by the one or more computing devices, whether the communication channel is an untrusted channel; and
    performing, by the one or more computing devices, a security action that protects against a potential social engineering scam attack upon determining that the communication channel is the untrusted channel.

2. The computer-implemented method of claim 1, wherein determining whether the communication channel is an untrusted channel comprises:
   establishing a proxy communication channel that receives communication requests for accessing the digital service;
   detecting whether the communication attempt is received over the proxy communication channel or another communication channel; and
   determining that the communication channel is the untrusted channel when the communication attempt is received over the another communication channel.

3. The computer-implemented method of claim 2, wherein establishing the proxy communication channel comprises:
   generating a communication address for receiving the communication requests for accessing the digital service; and
   authenticating data comprising the communication attempt for sending utilizing the communication address.

4. The computer-implemented method of claim 3, wherein authenticating the data comprising the communication attempt for sending utilizing the communication address comprises:
   encrypting the data comprising the communication attempt; and
   utilizing multi-factor authentication to authenticate the encrypted data.

5. The computer-implemented method of claim 1, wherein determining whether the communication channel is an untrusted channel comprises:
   detecting a communication attempt over the communication channel by an entity associated with providing the digital service;
   retrieving a profile comprising a list of digital services associated with a receiving party of the communication attempt;
   querying, based on the profile, a data store to identify a list of source communication channels associated with the list of digital services; and
   determining, based on the list of source communication channels, that the communication channel is the untrusted channel.

6. The computer-implemented method of claim 5, wherein querying, based on the profile, the data store to identify the list of source communication channels associated with the list of digital services comprises querying a distributed file system for the list of source communication channels.

7. The computer-implemented method of claim 5, wherein querying, based on the profile, the data store to identify the list of source communication channels associated with the list of digital services comprises querying a blockchain for the list of source communication channels.

8. The computer-implemented method of claim 5, wherein determining, based on the list of source communication channels, that the communication channel is the untrusted channel comprises determining that the communication channel is the untrusted channel when the list of source communication channels excludes the communication channel.

9. The computer-implemented method of claim 1, wherein performing the security action comprises generating a notification to a requester of the communication attempt that the communication channel is the untrusted channel.

10. The computer-implemented method of claim 1, wherein the communication channel comprises at least one of:
   a short messaging service (SMS) communication channel;
   a voice service communication channel; or
   an electronic mail service communication channel.

11. A system for preventing social engineering scam attacks by utilizing trusted communication channels for digital services, the system comprising:
   at least one physical processor; and
   physical memory comprising computer-executable instructions and one or more modules that, when executed by the physical processor, cause the physical processor to:
      detecting, by a detection module, a communication attempt associated with accessing a digital service over a communication channel;
      determine, by a determining module, whether the communication channel is an untrusted channel; and
      perform, by a security module, a security action that protects against a potential social engineering scam attack upon determining that the communication channel is the untrusted channel.

12. The system of claim 11, wherein the determining module determines whether the communication channel is an untrusted channel by:
   establishing a proxy communication channel that receives communication requests for accessing the digital service;
   detecting whether the communication attempt is received over the proxy communication channel or another communication channel; and
   determining that the communication channel is the untrusted channel when the communication attempt is received over the another communication channel.

13. The system of claim 12, wherein the proxy communication channel is established by:
   generating a communication address for receiving the communication requests for accessing the digital service; and
   authenticating data comprising the communication attempt for sending utilizing the communication address.

14. The system of claim 13, wherein the data comprising the communication attempt for sending utilizing the communication address is authenticated by:
   encrypting the data comprising the communication attempt; and
   utilizing multi-factor authentication to authenticate the encrypted data.

15. The system of claim 11, wherein the determining module determines whether the communication channel is an untrusted channel by:
   detecting a communication attempt over the communication channel by an entity associated with providing the digital service;
   retrieving a profile comprising a list of digital services associated with a receiving party of the communication attempt;
   querying, based on the profile, a data store to identify a list of source communication channels associated with the list of digital services; and
   determining, based on the list of source communication channels, that the communication channel is the untrusted channel.

16. The system of claim 15, wherein the data store is queried, based on the profile, to identify the list of source communication channels associated with the list of digital services by querying a distributed file system for the list of source communication channels.

17. The system of claim 15, wherein the data store is queried, based on the profile, to identify the list of source communication channels associated with the list of digital services by querying a blockchain for the list of source communication channels.

18. The system of claim 15, wherein, based on the list of source communication channels, the communication channel is determined as the untrusted channel by determining that the communication channel is the untrusted channel when the list of source communication channels excludes the communication channel.

19. The system of claim 11, wherein the security module performs the security action by generating a notification to a requester of the communication attempt that the communication channel is the untrusted channel.

20. A non-transitory computer-readable medium comprising one or more computer-executable instructions that, when executed by at least one processor of a computing device, cause the computing device to:
 detect a communication attempt associated with accessing a digital service over a communication channel;
 determine whether the communication channel is an untrusted channel; and
 perform a security action that protects against a potential social engineering scam attack upon determining that the communication channel is the untrusted channel.

* * * * *